US009677517B2

(12) United States Patent
Roten et al.

(10) Patent No.: US 9,677,517 B2
(45) Date of Patent: Jun. 13, 2017

(54) DUAL PATH COOL AIR INLET SYSTEM

(71) Applicants: Marvin L Roten, Fenton, MI (US); Mark J Duty, Goodrich, MI (US); Michael J Stempien, Oakland, MI (US); Gary L Baker, Carleton, MI (US); Abou B Rkie, Windsor (CA); Mark E Gleason, Farmington Hills, MI (US)

(72) Inventors: Marvin L Roten, Fenton, MI (US); Mark J Duty, Goodrich, MI (US); Michael J Stempien, Oakland, MI (US); Gary L Baker, Carleton, MI (US); Abou B Rkie, Windsor (CA); Mark E Gleason, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 67 days.

(21) Appl. No.: 14/702,073

(22) Filed: May 1, 2015

(65) Prior Publication Data

US 2016/0319783 A1 Nov. 3, 2016

(51) Int. Cl.
*F02M 35/16* (2006.01)
*F02M 35/024* (2006.01)
(Continued)

(52) U.S. Cl.
CPC ........... *F02M 35/161* (2013.01); *B60K 11/06* (2013.01); *B60K 13/02* (2013.01); *F02M 35/024* (2013.01);
(Continued)

(58) Field of Classification Search
CPC ...... F02D 2009/022; F02D 2009/0235; F02M 31/20; F02M 35/16; F02M 35/161;
(Continued)

(56) References Cited

U.S. PATENT DOCUMENTS 5,002,021 A * 3/1991 Nakata ............... F02M 35/1266 123/184.42
5,092,285 A 3/1992 Beaber
(Continued)

FOREIGN PATENT DOCUMENTS

DE 19951408 A1 5/2001
EP 0456957 A1 11/1991
(Continued)

OTHER PUBLICATIONS

International Search Report and Written Opinion dated Jul. 15, 2016 for International Application No. PCT/US2015/029939, International Filing Date Apr. 29, 2016.

*Primary Examiner* — John Kwon
*Assistant Examiner* — Johnny H Hoang
(74) *Attorney, Agent, or Firm* — Ralph E. Smith

(57) ABSTRACT

An air intake assembly configured to direct air into a throttle body of an engine of an automotive vehicle includes an air cleaner enclosure, primary and secondary air intake ducts and a downstream air intake duct. In a first operating condition, inlet air is directed into the air cleaner enclosure unit from the secondary air intake duct and routed (i) through the downstream air intake duct and into the throttle body and (ii) through the primary air intake duct and out of a primary air inlet. In a second operating condition, inlet air is directed into the air cleaner enclosure unit from the primary air intake duct and routed (iii) through the downstream air intake duct and into the throttle body and (iv) through the secondary air intake duct and out of the secondary air inlet. A method of directing the intake air into the throttle body is also provided.

10 Claims, 4 Drawing Sheets

(51) Int. Cl.
*F02M 35/10* (2006.01)
*B60K 11/06* (2006.01)
*B60K 13/02* (2006.01)

(52) U.S. Cl.
CPC *F02M 35/10013* (2013.01); *F02M 35/10078* (2013.01); *F02M 35/10131* (2013.01)

(58) Field of Classification Search
CPC ........... F02M 35/024; F02M 35/10078; F02M 35/10098; F01P 5/00; F01P 5/06; F01P 11/10; F01P 11/12
USPC ............ 123/184.21, 194.25, 184.26, 184.35, 123/184.36, 184.42, 184.43, 184.48, 123/184.49, 184.53, 198 E, 337, 434, 542, 123/41.01, 41.13, 41.22, 41.27, 41.56, 123/41.65, 41.68, 41.79; 55/385.3
See application file for complete search history.

(56) References Cited

U.S. PATENT DOCUMENTS

| | | | | |
|---|---|---|---|---|
| 5,251,712 | A | 10/1993 | Hayashi et al. | |
| 5,320,190 | A | 6/1994 | Naumann et al. | |
| 5,492,093 | A | 2/1996 | Rygiel | |
| 6,314,949 | B1 | 11/2001 | DeGrazia, Jr. et al. | |
| 6,510,832 | B2 * | 1/2003 | Maurer | F02M 35/10013 123/198 E |
| 6,691,665 | B2 | 2/2004 | Gray et al. | |
| 7,004,154 | B2 | 2/2006 | Joyce et al. | |
| 7,004,245 | B2 | 2/2006 | Abdeljawad | |
| 7,393,372 | B2 * | 7/2008 | Cassell | F02M 35/024 123/198 E |
| 7,398,770 | B2 | 7/2008 | Acuna, Sr. et al. | |
| 7,493,881 | B2 | 2/2009 | Smith et al. | |
| 8,025,707 | B2 * | 9/2011 | Furuya | B01D 46/06 123/198 E |
| 8,048,179 | B2 * | 11/2011 | Miller | F02M 35/024 123/198 E |
| 8,137,425 | B2 * | 3/2012 | Saito | F02M 35/02 123/198 E |
| 8,967,128 | B2 * | 3/2015 | Bellis | F02M 35/024 123/434 |
| 2007/0017471 | A1 * | 1/2007 | Suzuki | F02M 35/024 123/184.42 |
| 2011/0114050 | A1 | 5/2011 | Jung | |
| 2014/0165961 | A1 * | 6/2014 | Patel | F02M 35/10255 123/337 |
| 2014/0182956 | A1 * | 7/2014 | Morey | B60K 11/06 180/68.1 |

FOREIGN PATENT DOCUMENTS

| | | | |
|---|---|---|---|
| JP | 2000 303925 | A | 10/2000 |
| WO | 2008093207 | A1 | 8/2008 |

* cited by examiner

DUAL PATH COOL AIR INLET SYSTEM

FIELD

The present application relates generally to air intake systems of motor vehicles and, more particularly, to an air inlet system of a motor vehicle that incorporates a dual path.

BACKGROUND

Air intake assemblies are provided on automotive motor vehicles to deliver intake air to an intake manifold of an internal combustion engine. The air intake assembly is arranged in an engine compartment of the automotive vehicle. The air intake assembly can include an air cleaner enclosure unit and an air intake duct. In one common arrangement, intake air can flow from the air cleaner enclosure unit, through the intake duct and into the intake manifold.

In general, the engine compartment can get hot in temperature due to the operational temperatures of the various components housed in the engine compartment, including the internal combustion engine and exhaust system. As a result, the intake air is undesirably warmed as it passes through the air cleaner enclosure unit and the air intake duct. As the temperature of the intake air increases, a reduction in engine power and fuel economy occurs. Thus, while cold air intake systems work for their intended purpose, there remains a need for improvement in the relevant art.

SUMMARY

In one aspect of the invention, an air intake assembly arranged in an engine compartment of an automotive vehicle is provided. The air intake assembly is configured to direct air into a throttle body of an internal combustion engine of the automotive vehicle. The air intake assembly includes an air cleaner enclosure, a primary air intake duct, a secondary air intake duct and a downstream air intake duct. The air cleaner enclosure unit has a first air cleaner inlet, a second air cleaner inlet and an air cleaner outlet. The primary air intake duct directs air between a primary air inlet and the first air cleaner inlet. The secondary air intake duct directs air between a secondary air inlet and the second air cleaner inlet. The downstream air intake duct is fluidly connected between and configured to direct air from the air cleaner outlet to the throttle body.

The air intake assembly is configured to alternatively operate between two conditions. In the first condition, inlet air is directed into the air cleaner enclosure unit from the secondary air intake duct and routed concurrently (i) through the downstream air intake duct and into the throttle body and (ii) through the primary air intake duct from the first air cleaner inlet and out of the primary air inlet. In the second condition, inlet air is directed into the air cleaner enclosure unit from the primary air intake duct and routed concurrently (iii) through the downstream air intake duct and into the throttle body and (iv) through the secondary air intake duct from the second air cleaner inlet and out of the secondary air inlet.

According to additional features, inlet air is directed into the air cleaner enclosure unit from the secondary air intake duct when the air pressure is higher at the secondary air inlet than the primary air inlet. The air pressure is higher at the secondary air inlet than the primary air inlet when the automotive vehicle is at idle. The inlet air is directed into the air cleaner enclosure from the primary air intake duct when the air pressure is higher at the primary air inlet than the secondary air inlet. The air pressure is higher at the primary air inlet than the secondary air inlet when the automotive vehicle is in motion.

In other features, the secondary air inlet is arranged at a wheel well of the automotive vehicle. The primary air inlet is arranged proximate to a fan in the engine compartment. Operation of the fan further encourages the air to be routed through the primary air intake duct from the first air cleaner inlet and out of the primary air inlet. The primary air intake duct further comprises a baffle that directs air generally toward the fan to encourage air to be drawn out of the primary air inlet. The air cleaner enclosure unit further includes an air filter supported therein.

A method of directing intake air into a throttle body of an internal combustion engine of an automotive vehicle is provided. The method includes arranging an air cleaner enclosure unit into an engine compartment of the automotive vehicle. The air cleaner enclosure unit has a first air cleaner inlet, a second air cleaner inlet and an air cleaner outlet. A primary air intake duct is routed between a primary air inlet and the first air cleaner inlet. A secondary air intake is routed between a secondary air inlet and the second air cleaner inlet. A downstream air intake duct is routed between the air cleaner outlet and the throttle body. The inlet air is alternatively directed based on two conditions. In the first condition, inlet air is directed into the air cleaner enclosure unit from the secondary air intake duct. The inlet air is routed concurrently (i) through the downstream air intake duct and into the throttle body and (ii) through the primary air intake duct from the first air cleaner inlet and out of the primary air inlet. In the second condition, inlet air is directed into the air cleaner enclosure unit from the primary air intake duct. The inlet air is routed concurrently (iii) through the downstream air intake duct and into the throttle body and (iv) through the secondary air intake duct from the second air cleaner inlet and out of the secondary air inlet.

According to other features, the inlet air is directed into the air cleaner enclosure unit from the secondary air intake duct when the air pressure is higher at the secondary air inlet than the primary air inlet. The air pressure is higher at the secondary air inlet than the primary air inlet when the automotive vehicle is at idle.

In other features, the inlet air is directed in to the air cleaner enclosure unit from the primary air intake duct when the air pressure is higher at the primary air inlet than the secondary air inlet. The air pressure is higher at the primary air inlet than the secondary air inlet when the automotive vehicle is in motion.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
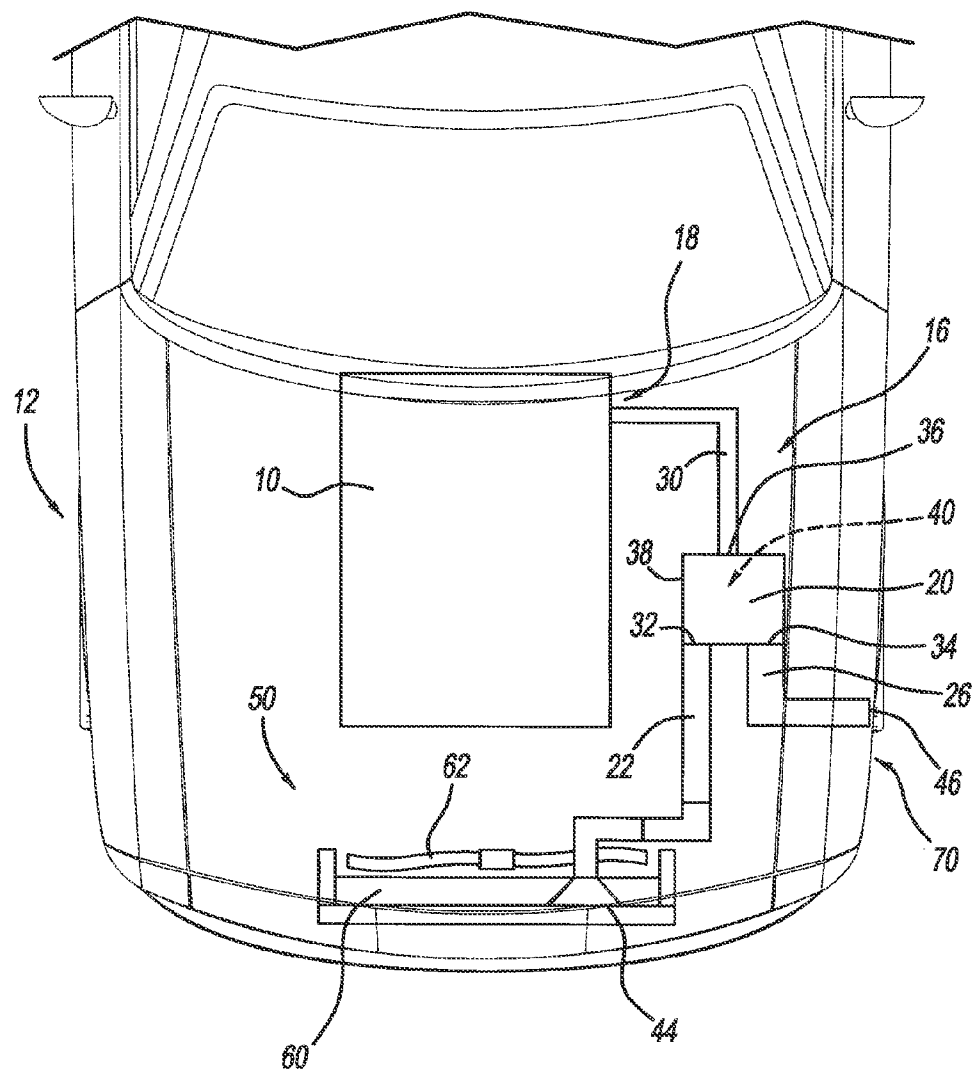
FIG. 1 is a top view of a schematic illustration of an air intake assembly directing air into an internal combustion engine according to one example of the present disclosure.

With initial reference to FIG. 1, an internal combustion engine 10 for powering an automotive vehicle 12 according to one example of the present disclosure is shown. Intake air is directed through an air intake assembly 16 and into a throttle body 18 of the internal combustion engine 10. The air intake assembly 16 includes an air cleaner enclosure unit or air box 20, a primary air intake duct 22, a secondary air intake duct 26 and a downstream air intake duct 30. The air cleaner enclosure unit 20 further includes a first air cleaner inlet 32, a secondary air cleaner inlet 34 and an air cleaner outlet 36. The air cleaner enclosure unit 20 includes a housing 38 that supports an air filter 40. The primary air intake duct 22 directs air between a primary air inlet 44 and the first air cleaner inlet 32. The secondary air intake duct 26 directs air between a secondary air inlet 46 and the second air cleaner inlet 34. The downstream air intake duct 30 is fluidly connected between the air cleaner outlet 36 and the throttle body 18. The downstream air intake duct 30 directs air from the air cleaner outlet 36 into the throttle body 18 of the internal combustion engine 10.

The air intake assembly 16 is arranged in an engine compartment 50 of the automotive vehicle 12. In general, the engine compartment 50 can get hot in temperature from radiative and conducting heat sources. As a result, the intake air provided by the air intake assembly 16 is warmed as it passes through the air cleaner enclosure unit 20 and the air intake duct 22. In addition, air entering the primary air inlet 44 tends to be hot as well. As the temperature of the intake air increases, the loss of engine power also increases. As will become more appreciated from the following discussion, the present disclosure provides an improved air intake assembly that benefits from a dual path air intake that delivers cooler air into the throttle body 18, improving engine performance and fuel economy.

The primary air intake duct 22 will be further described. The primary air intake duct 22 can be arranged to have the primary air inlet 44 proximate to a vehicle radiator 60 and a radiator fan 62. As will become appreciated from the following discussion, in some vehicle driving conditions, a low pressure zone 64A (FIG. 2) exists adjacent to the primary inlet 44 such as when the radiator fan 62 is operating and the vehicle 12 is at idle. In other driving conditions, a high pressure zone 64B (FIG. 3) exists adjacent to the primary inlet 44 such as when the vehicle is moving at speed. The primary air intake duct 22 can be constructed out of a rigid lightweight material such as plastic. It will be appreciated that the primary air intake duct 22 may be routed differently in the engine compartment 50 than shown in the drawings based on a vehicle application.

The secondary air intake duct 26 will be further described. The secondary air intake duct 26 can be configured to have the secondary air inlet 46 arranged at a wheel well 70 of the vehicle 12. The wheel well 70 can provide a generally cooler air source as compared to the engine compartment 50. It will be appreciated that the secondary air intake duct 26 may be routed differently in the engine compartment 50 than shown in the drawings based on a vehicle application. It will also be appreciated that the secondary air inlet 46 may be located in other locations around the vehicle 12.

Figure 2:
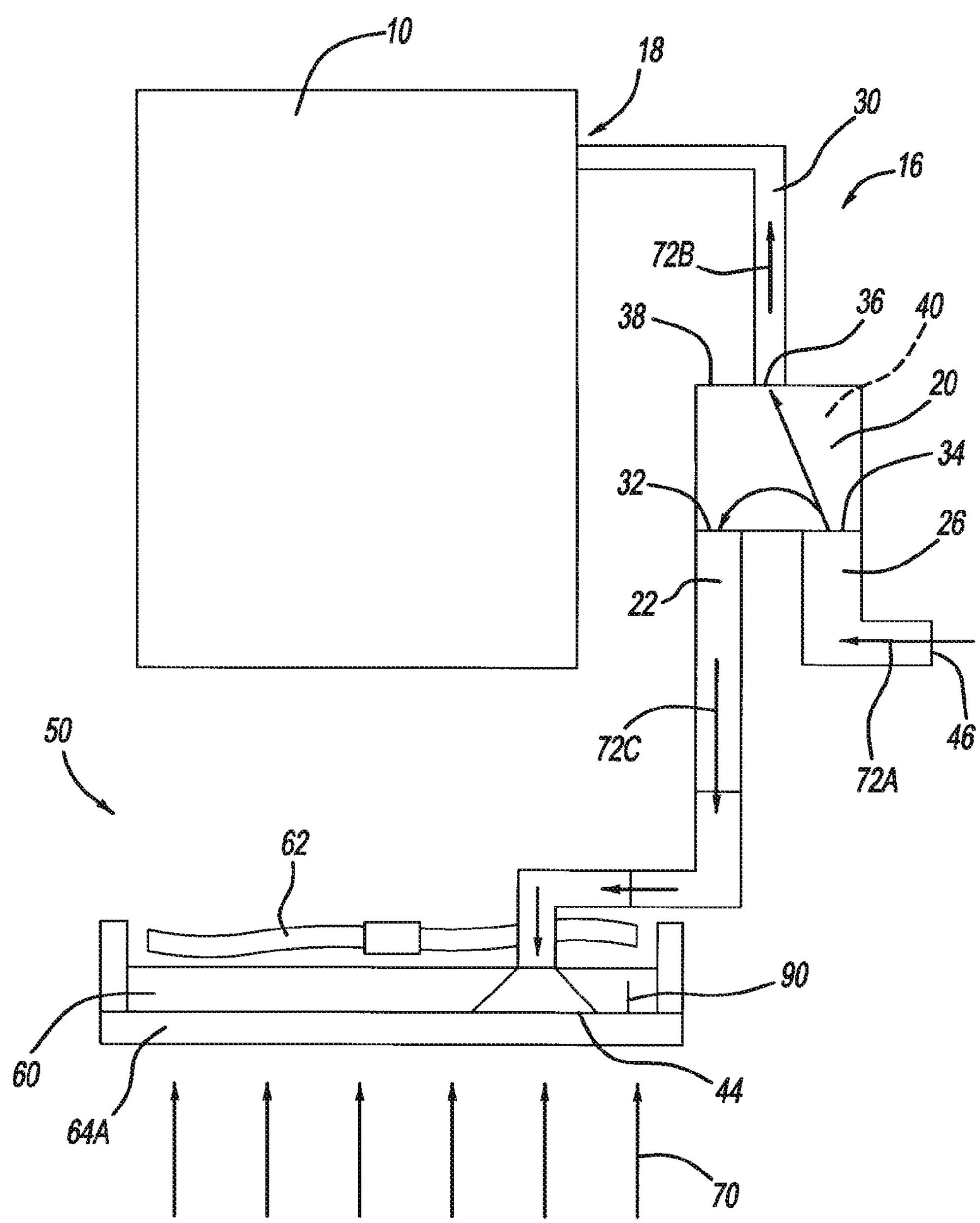
FIG. 2 is a schematic illustration of the air intake assembly of FIG. 1 and shown in an exemplary operating condition where the vehicle is at idle.

With particular reference now to FIG. 2, operation of the air intake assembly 16 according to the present disclosure will now be described. The example shown in FIG. 2 illustrates the vehicle 12 (FIG. 1) operating at idle. At idle, the engine 10 is running at low speed and the vehicle 12 is stopped or slowly moving in a forward direction. When the engine 10 is running and the ambient air is hot, such as during summer driving conditions, the radiator fan 62 operates to draw ambient air 70 toward the radiator 64. As the ambient air 70 is pulled in through the radiator 60 and toward the fan 62, the low pressure zone 64A is created. As a result, inlet air (fresh air supply) 72A is directed into the air cleaner enclosure 20 from the secondary air inlet 46 of the secondary air intake duct 26 and routed concurrently (i) as inlet air 72B through the downstream air intake duct 30 and into the throttle body 18 and (ii) as inlet air 72C through the primary air intake duct 22 from the first air cleaner inlet 32 and out of the primary air inlet 44. In this regard, because a higher pressure exists at the secondary air inlet 46 compared to the primary inlet 44, cool air is drawn into the air intake assembly 16 from the secondary air inlet 46.

The throttle body 18 will accept an appropriate amount of intake air 72B to run the engine 10 while the remainder will be directed as intake air 72C through the primary intake duct 22. Explained differently, the engine 10 will only take the amount of inlet air 72B that it needs through the throttle body 18 while a remainder is diverted back through the primary intake duct 22. By way of example only, for a four cylinder engine, the throttle body 18 may take in only about 6 cubic feet per minute (CFM) while the secondary air intake duct 26 can take in about 20 CFM when the vehicle is at idle. Other values are contemplated. It will be appreciated that the amount of intake air 72B required by the engine 10 at idle is significantly less than the remainder of the intake air 72C exiting through the primary inlet 44 of the primary intake duct 22. In the example above, the throttle body 18 may only require about one-fourth of the total air entering the secondary air intake duct 26. The remainder of the intake air is used to cool the rest of the air intake assembly 16 including the primary intake duct 22. Notably, the air intake assembly 16 of the present disclosure introduces a significantly higher volume of fresh intake air 72A into the system as compared to a conventional air intake assembly that may only route a volume of air necessary to feed the engine 12.

The volume of intake air 72A and 72C provides a significant cooling advantage over conventional systems. In this regard, the air intake assembly 16 uses many multiples of cool fresh air to route through the primary and secondary intake ducts 22, 26 whereas a conventional system only routes a minimal volume of air dictated by the engine requirements. As explained above, in a conventional system during idle conditions, low volumes of air flowing through a single intake duct along a path through the engine compartment 50 can tend to be very hot ultimately reducing engine performance and fuel economy.

As can be appreciated, while the inlet air 72A, 72B and 72C is routed through the intake air assembly 16, the whole intake air assembly 16 (including the primary intake duct 22, secondary intake duct 26, downstream air intake duct 30 and air cleaner enclosure 20) is cooled. By cooling the air intake assembly 16 as a whole, cooler inlet air can be introduced into the throttle body 18 improving fuel economy and engine performance. Further, the time taken to cool the intake air assembly 16 at idle conditions can establish a relatively cooler air intake assembly 16 when the engine revolutions per minute (RPM) increase or when the vehicle 12 begins to move.

Figure 3:
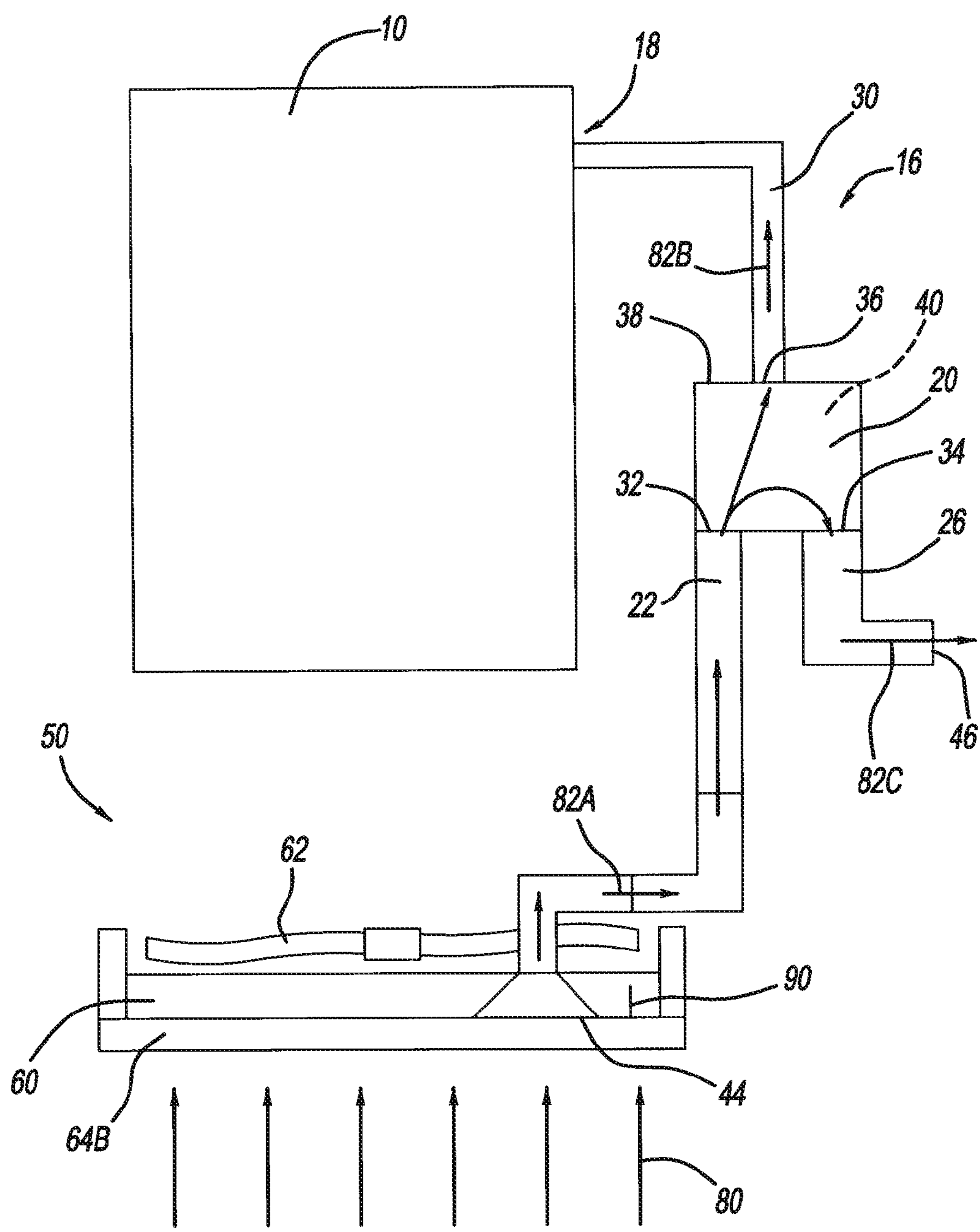
FIG. 3 is a schematic illustration of an air intake assembly of FIG. 1 and shown in an exemplary operating condition where the vehicle is in motion.

Turning now to FIG. 3, operation of the air intake assembly 16 while the vehicle 12 is in motion according to the present disclosure will now be described. When the vehicle 12 is in motion, ambient air 80 is directed into the engine compartment 50 such as through the front grill of the vehicle 12. Some of the ambient air 80 is directed into the primary inlet 44 as inlet air (fresh air supply) 82A. It will be appreciated that in this driving condition, the high pressure zone 64B is created (also referred to as "ram air" where intake air is forced into the primary inlet 44).

Inlet air 82A is directed into the air cleaner enclosure 20 from the primary air inlet 44 of the primary air intake duct 22 and routed concurrently (i) as inlet air 82B through the downstream air intake duct 30 and into the throttle body 18 and (ii) as inlet air 82C through the secondary air intake duct 26 from the second air cleaner inlet 34 and out of the secondary air inlet 46. In this regard, because a higher pressure exists at the primary inlet 44 as compared to the secondary inlet 46, cool air is drawn into the air intake assembly 16 at the primary inlet 44. The throttle body 18 will accept an appropriate amount of intake air 82B to run the engine 10 while the remainder will be directed as intake air 82C through the secondary intake duct 26. It will be appreciated that the amount of intake air 82B required by the engine 10 while the engine is running at higher RPM than idle is greater than required at idle conditions. The remainder of the intake air 82C exits through the secondary outlet 46 of the secondary intake duct 26.

Similar to the condition described with the vehicle at idle in FIG. 2, the intake air system 16 as a whole is cooled while the vehicle is in motion in FIG. 3. In this regard, while the intake air 82A, 82B and 82C is routed through the intake air assembly 16, the whole intake air assembly 16 (including the primary intake duct 22, secondary intake duct 26, downstream air intake duct 30 and air cleaner enclosure 20) is cooled. By cooling the air intake assembly 16 as a whole, cooler inlet air can be introduced into the throttle body 18 improving fuel economy and engine performance.

In other examples, the intake air assembly 16 may incorporate baffles such as in the air cleaner enclosure 20 to further promote heat transfer. Additional baffles may be arranged at the primary inlet 44 and/or at the secondary inlet 46. FIG. 2 illustrates one such exemplary baffle 90 that can be arranged to further influence the intake air 72C to be directed out of the primary air inlet 44 by the fan such as during idle conditions. Again, it will be appreciated that the geometry of the baffle 90 is merely exemplary and other configurations are contemplated. According to other advantages, the high volumes of inlet air routed out of the secondary inlet 46 (while the vehicle is moving, FIG. 3) and out of the primary inlet 44 (while the vehicle is at idle, FIG. 2) can further facilitate cleaning out (debris, snow etc.) of the secondary air intake duct 26 and the primary air intact duct 22, respectively.

Figure 4:
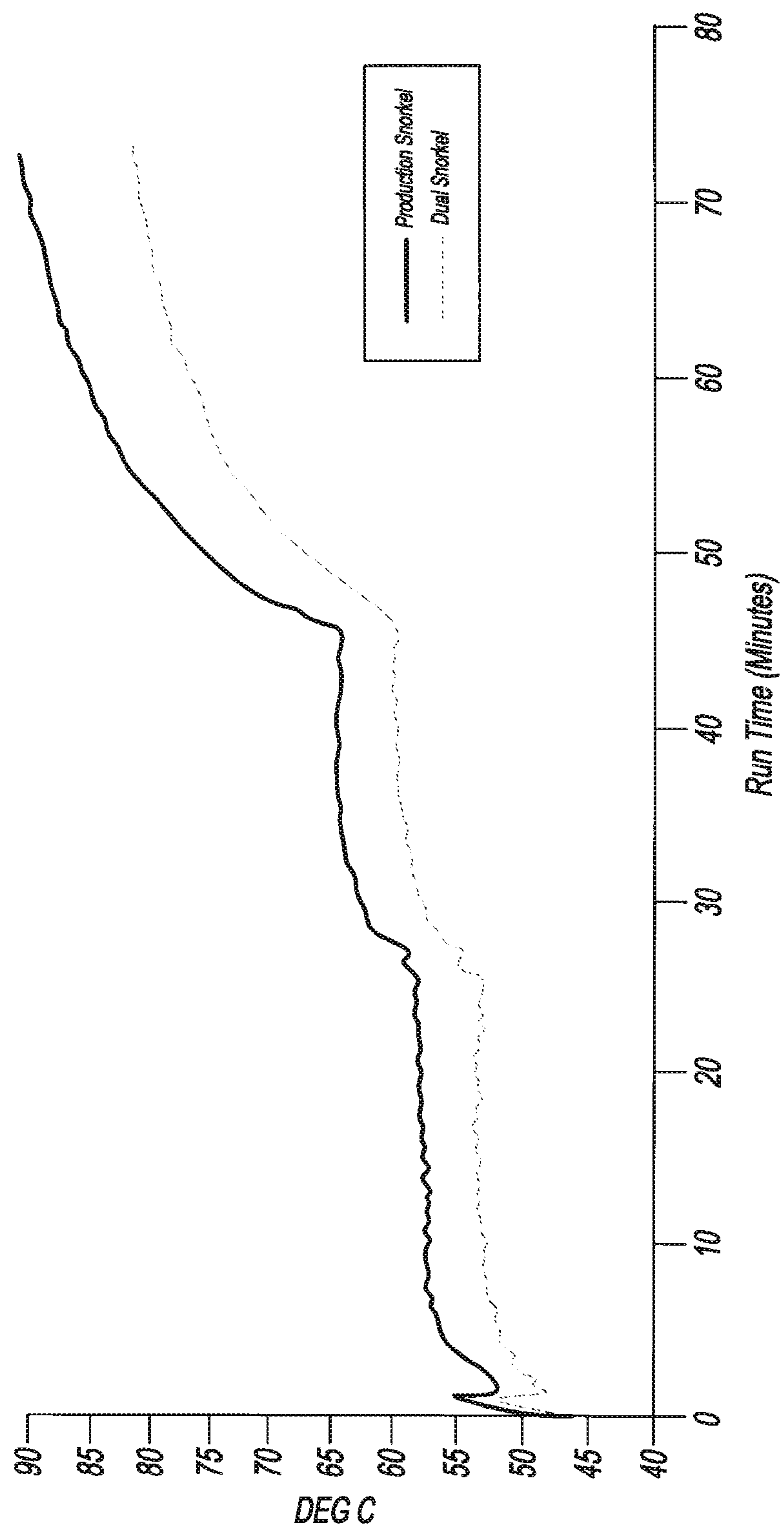
FIG. 4 is an exemplary plot showing run time versus degrees Celsius of an air intake assembly constructed in accordance to prior art (Production Snorkel) and an air intake assembly constructed in accordance to one example of the present disclosure (Dual Snorkel).

Turning now to FIG. 4, an exemplary plot showing run time versus degrees Celsius of an air intake assembly constructed in accordance to prior art (Production Snorkel) and an air intake assembly 16 constructed in accordance to one example of the present disclosure (Dual Snorkel). As shown, the air intake assembly 16 provides intake air at a significantly reduced temperature compared to production snorkel configurations.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An air intake assembly arranged in an engine compartment of an automotive vehicle and configured for directing air into a throttle body of an engine of the vehicle, the air intake assembly comprising:

an air cleaner enclosure unit having a first air cleaner inlet, a second air cleaner inlet and an air cleaner outlet;

a primary air intake duct that directs air between a primary air inlet and the first air cleaner inlet;

a secondary air intake duct that directs air between a secondary air inlet and the second air cleaner inlet; and a downstream air intake duct fluidly connected between and configured to direct air from the air cleaner outlet to the throttle body;

wherein the air intake assembly is configured to alternatively operate between the following two conditions based on a first air pressure at the primary inlet and a second air pressure at the secondary inlet:

(A) inlet air is directed into the air cleaner enclosure unit from the secondary air intake duct when the second air pressure is higher than the first air pressure and routed concurrently (i) through the downstream air intake duct and into the throttle body and (ii) through the primary air intake duct from the first air cleaner inlet and out of the primary air inlet; and (B) inlet air is directed into the air cleaner enclosure unit from the primary air intake duct when the first air pressure is higher than the second air pressure and routed concurrently (iii) through the downstream air intake duct and into the throttle body and (iv) through the secondary air intake duct from the second air cleaner inlet and out of the secondary air inlet.

2. The air intake assembly of claim 1 wherein an air pressure is higher at the secondary air inlet than the primary air inlet when the automotive vehicle is at idle.

3. The air intake assembly of claim 1 wherein an air pressure is higher at the primary air inlet than the secondary air inlet when the automotive vehicle is in motion.

4. The air intake assembly of claim 1 wherein the secondary air inlet is arranged at a wheel well of the automotive vehicle.

5. The air intake assembly of claim 1 wherein the primary air inlet is arranged proximate to a fan in the engine compartment, and wherein operation of the fan further encourages the air to be routed through the primary air intake duct from the first air cleaner inlet and out of the primary air inlet.

6. The air intake assembly of claim 5 wherein the primary air intake duct further comprises a baffle that directs air generally toward the fan to encourage air to be drawn out of the primary air inlet.

7. The air intake assembly of claim 1 wherein the air cleaner enclosure unit further comprises an air filter supported therein.

8. A method of directing intake air into a throttle body of an engine of an automotive vehicle, the method comprising:

arranging an air cleaner enclosure unit having a first air cleaner inlet, a second air cleaner inlet and an air cleaner outlet into an engine compartment of the automotive vehicle;

routing a primary air intake duct between a primary air inlet and the first air cleaner inlet;

routing a secondary air intake duct between a secondary air inlet and the second air cleaner inlet;

routing a downstream air intake duct between the air cleaner outlet and the throttle body;

alternatively directing inlet air between the following two conditions based on a first air pressure at the primary inlet and a second air pressure at the secondary inlet:

(A) directing inlet air into the air cleaner enclosure unit from the secondary air intake duct when the second air pressure is higher than the first air pressure and routing the inlet air concurrently (i) through the downstream air intake duct and into the throttle body and (ii) through the primary air intake duct from the first air cleaner inlet and out of the primary air inlet; and (B) directing inlet air into the air cleaner enclosure unit from the primary air intake duct when the first air pressure is higher than the second air pressure and routing the inlet air concurrently (iii) through the downstream air intake duct and into the throttle body and (iv) through the secondary air intake duct from the second air cleaner inlet and out of the secondary air inlet.

9. The method of claim 8 wherein an air pressure is higher at the secondary air inlet than the primary air inlet when the automotive vehicle is at idle.

10. The method of claim 8 wherein an air pressure is higher at the primary air inlet than the secondary air inlet when the automotive vehicle is in motion.

* * * * *